Dec. 5, 1967   P. D. FADOW   3,356,426
PIVOTAL BEARING ASSEMBLY
Filed Aug. 11, 1965
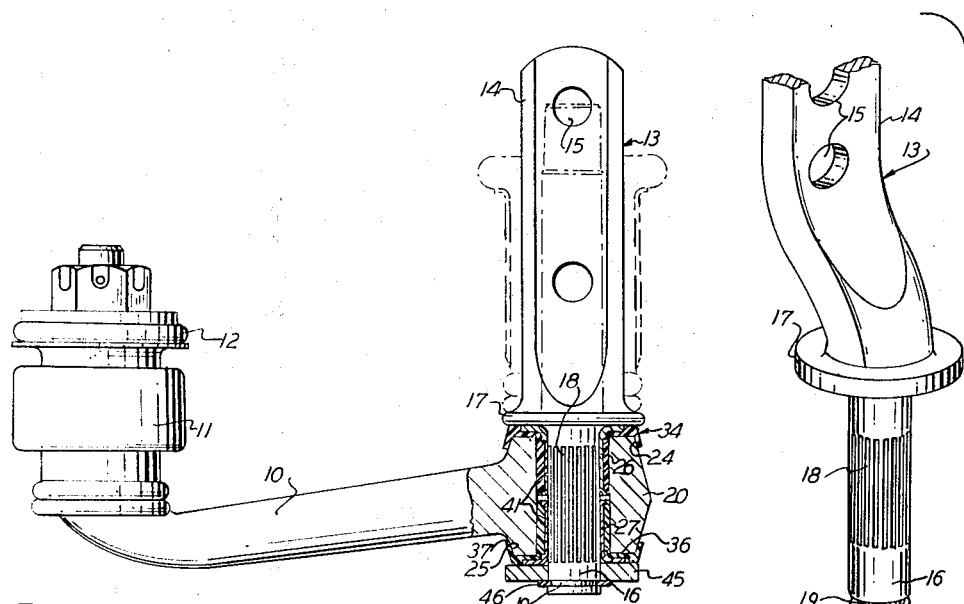
FIG. 1
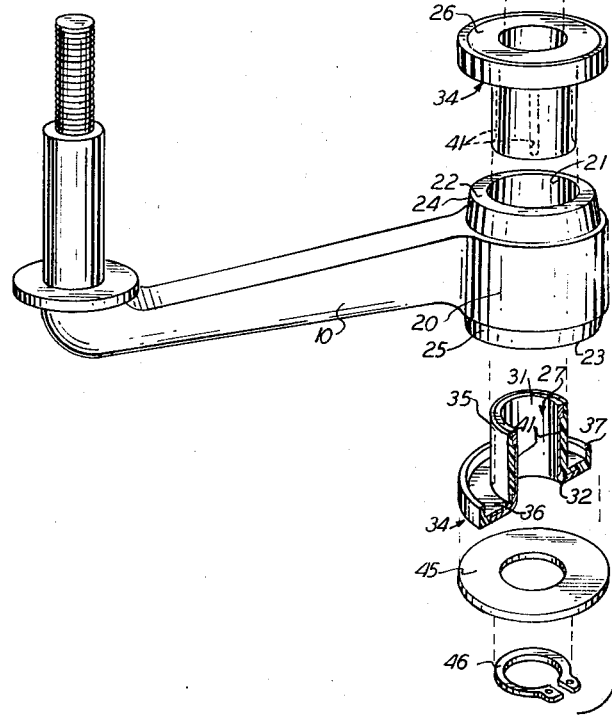
PAUL D. FADOW
INVENTOR
BY John R. Faulkner
Keith L. Zerschling
ATTORNEYS

United States Patent Office 3,356,426
Patented Dec. 5, 1967

3,356,426
PIVOTAL BEARING ASSEMBLY
Paul D. Fadow, Dearborn Heights, Mich., assignor to Ford Motor Company, Dearborn, Mich., a corporation of Delaware
Filed Aug. 11, 1965, Ser. No. 478,827
1 Claim. (Cl. 308—36.1)

This invention relates to a pivotal bearing member and assembly for pivotally connecting links in a steering linkage system and more particularly to a pivotal bearing member and assembly that may be employed to pivotally connect an idler arm to a stationary bracket.

In the invention, a pair of cylindrical metallic sleeve members having radially extending flanges are provided. Each of these cylindrical metallic sleeve members has an integral thin sheet of low friction thermoplastic material bonded thereto, preferably by a mechanical bond. This thin sheet includes an axially extending lip portion that extends generally parallel to that portion positioned around the cylindrical portion of the sleeve. Each of the cylindrical metallic sleeve members is nonrotatably positioned upon a spindle that may be formed as part of a bracket in the steering linkage, and each is positioned within a bore in a cylindrical end portion of a link, preferably the idler arm of a steering linkage. The portion of the thin sheet of thermoplastic material that is positioned around the cylindrical portion of each cylindrical metallic sleeve member serves as a radial bearing member between the spindle and the link, the portion positioned against the flange of each cylindrical metallic sleeve member serves as a thrust bearing between the spindle and the link or idler arm, and the axially extending lip engages the outer diameter of the cylindrical portion of the link or idler arm to serve as a seal. During assembly, a long-life lubricant may be employed to cover this thin sheet of thermoplastic material to provide a lubricated-for-life pivotal joint.

The cylindrical metallic sleeve members with the cylindrical main portions and the radially extending flanges serve as a backup material for the thin sheet of low friction thermoplastic material, such as nylon, to strengthen this material and permit it to handle heavy loads without deforming in any substantial way.

An object of the present invention is the provision of a pivotal bearing assembly that may be used to couple an idler arm to another link in a steering system in which a pair of oppositely disposed members serve as both radial and thrust bearings as well as providing a seal for the pivotal bearing.

A further object of the invention is the provision in an idler arm assembly of a pivotal joint that is inexpensive, has few parts, and is capable of handling high loads without substantial deformation.

Other objects and attendant advantages of the present invention may be more readily realized as the specification is considered in connection with the attached drawings, in which:

FIGURE 1 is a side elevational view of a steering linkage incorporating the pivotal bearing assembly of this invention, and more specifically shows an idler arm of a steering linkage that is pivotally connected to a bracket adapted to be fixed to the frame of an automotive vehicle by the pivotal bearing assembly, and FIGURE 2 is an exploded view of the pivotal bearing assembly of this invention together with the bracket and the idler arm.

Referring now to the drawings in which like reference numerals designate like parts throughout the several thereof, there is shown in FIGURE 1 an idler arm 10 that forms one of the links of a steering linkage for an automotive vehicle. The idler arm 10 may be coupled to another link 11 of the steering linkage through a conventional pivotal bearing assembly 12.

A bracket 13 having a flattened end portion 14 is designed to be affixed to the frame or other structural member of an automotive vehicle body through apertures 15 that may receive bolts (not shown) to affix the bracket 13 to the vehicle body. The bracket 13 includes a cylindrical spindle 16 formed integrally at one end thereof and a radially extending integral flange 17 formed between the spindle 16 and the flattened end portion 14. The spindle 16 includes serrations 18 and a groove 19 at one end thereof opposite the radially extending flange 17.

The idler arm 10 includes a cylindrical end portion 20 having a bore 21 positioned therein and having machined end surfaces 22 and 23. Surfaces 24 and 25 positioned on the outer diameter thereof adjacent the machined end portions 22 and 23 respectively are also machined.

A pair of cylindrical metallic sleeve members, generally designated by the numerals 26 and 27, are included in the pivotal bearing assembly. Each of these sleeve members includes a cylindrical body portion 31 and a radially extending flange 32. The inner diameter of the cylindrical body portion 31 is designed to be forced over the serrations 18 on the spindle 16 and is dimensioned so that the serrations 18 prevent relative rotation between the cylindrical metallic sleeve members 26 and 27 and the spindle 16. Each of the sleeves has a thin sheet 34 of low friction high density thermoplastic material, for example, nylon, that is of high density positioned thereon preferably by means of a mechanical bond that bonds this thin sheet of thermoplastic material to the cylindrical body portion 31 of the sleeves 26 and 27.

The thin sheet 34 of thermoplastic material includes a cylindrical portion 35 bonded to the cylindrical portion 31 of the cylindrical metallic sleeve members 26 and 27 and a radially integrally formed extending flange 36 positioned against the radially extending flange 32 of these sleeve members. In addition, a generally axially extending lip 37 is formed integrally with the flange portion 36, and this lip forms a cylindrical section generally parallel to the cylindrical portion 35.

The thin sheet 34 of thermoplastic material may be injection molded onto each of the cylindrical metallic sleeve members 26 and 27, and may be mechanically bonded to the cylindrical section 31 of these sleeve members through the use of a plurality of axially extending grooves 41.

In assembly, the cylindrical metallic sleeve members 26 and 27 together with the integrally formed thin sheets 34 of thermoplastic material are positioned in the bore 21 of the cylindrical end portion 20 of the idler arm 10. The bore 21 and the cylindrical portion 35 of the thin sheets of thermoplastic material 34 are dimensioned so that a radial bearing is provided between the cylindrical end portion 20 of the idler arm 10 and the cylindrical portion 35 of the thin sheet of thermoplastic material 34. The radially extending flanges 36 of the thin sheets of thermoplastic material 34 engage the machined end portions 22 and 23 of the cylindrical end portion 20 of the idler arm 10 to provide thrust bearing surfaces, and the axially extending lips 37 of generally cylindrical section engage the machined outer diameter surfaces 24 and 25 on the cylindrical end portion 20 to provide a seal.

After the cylindrical metallic sleeve members 26 and 27, including the thin sheets of thermoplastic material 34, are positioned within the bore 21 in the cylindrical end portion 20 of the idler arm 10, the spindle 16 of the bracket 13 is driven through the cylindrical body portions 31 on the metallic sleeve members 26 and 27 with the serrations 18 gripping the internal diameters of the cylindrical body portions 31 of these two sleeve members in a nonrotatable manner. A thrust washer 45 is then positioned over the end of the spindle 16 opposite the integrally formed radial flange 17 on the bracket member 13. A fastening means which may take the form of a snap ring 46 is positioned in the groove 19 to force the radially extending flange 32 on the cylindrical metallic sleeve member 26 into engagement with the integrally formed radial flange 17 on the bracket 13 thereby providing thrust surfaces between the metallic sleeve members 26 and 27 and the integrally formed flange 17 on the bracket 13 and the thrust washer 45 respectively.

As a result, there is formed a pivotal connection between the spindle 16 on the bracket 13 and the idler arm 10 in which the two cylindrical metallic sleeve members 26 and 27 together with the above-described thin sheets of thermoplastic material covering these members form a combination radial bearing, thrust bearing and seal in which the surfaces 35 of the thin sheets of thermoplastic material 34 form the radial bearing, the extending flanges 36 form the thrust bearing surfaces, and the axially extending cylindrical lips 37 form the seal. It can be readily appreciated that a suitable lubricant may be used to coat the outer surfaces of the thin sheets of thermoplastic material 34 that engage the cylindrical end portion 20 of the idler arm 10 to provide a lubricated-for-life pivotal connection.

It can also be appreciated that the cylindrical metallic sleeve members 26 and 27 provide a backup material at all stress points for the thin sheets of thermoplastic material 34.

Accordingly, the present invention provides an inexpensive pivotal bearing arrangement for a steering linkage that incorporates a very minimum number of parts and that has long life due to its unique construction.

It is to be understood that this invention is not to be limited to the exact construction shown and described, and that various changes and modifications may be made without departing from the spirit and scope of the invention as defined in the appended claim.

What is claimed is:

In a steering linkage assembly, a fixed bracket having a spindle, an idler arm, said idler arm including a cylindrical end portion having a bore positioned therein, a combination radial bearing, thust bearing and seal positioned between said spindle and said cylindrical end portion of said idler arm comprising a pair of metallic sleeve members each having an extending cylindrical body portion and a radially extending flange, each of said sleeves having a continuous thin layer of substantially rigid high density synthetic thermoplastic material bonded to the outer diameter thereof and covering the face of the flange facing said outer diameter, said thin layer of high density synthetic thermoplastic material having an axially extending lip portion integrally formed with the portion thereof covering said flange, said pair of metallic sleeve members being nonrotatably mounted on said spindle with the portion of the continuous thin layer of thermoplastic material bonded to the outer diameter of the sleeve members slidably engaging the inner diameter of said cylindrical end portion, the portion of the continuous thin layer of thermoplastic material covering the flange slidably engaging the ends of said cylindrical portion of said idler arm, said lip sealingly and slidingly engaging the outer surface of said cylindrical end portion of said idler arm, and the ends of said cylindrical portion of said idler arm and the outer surfaces engaging said lips being machined to provide a smooth bearing surface.

References Cited

UNITED STATES PATENTS

| | | | |
|---|---|---|---|
| 1,959,254 | 5/1934 | Zerk | 308—26 |
| 2,554,008 | 8/1951 | Burger | 308—26 X |
| 2,608,751 | 9/1952 | Hutton | 308—26 X |
| 2,621,949 | 12/1952 | Grantham | 287—85 |
| 2,767,033 | 10/1956 | Wright | 308—36.1 |
| 2,880,027 | 3/1959 | Everitt | 308—26 |
| 2,915,326 | 12/1959 | Mason | 308—36.1 |
| 2,973,213 | 2/1961 | Moskovitz | 287—85 |
| 2,993,715 | 7/1961 | Hutton | 287—85 |
| 3,008,779 | 11/1961 | Spriggs | 308—238 |
| 3,047,934 | 8/1962 | Magner | 308—238 X |
| 3,107,953 | 10/1963 | Palm | 308—36.1 |
| 3,130,991 | 4/1964 | Piragino | 308 |
| 3,133,769 | 5/1964 | Drake | 308—26 X |

MARTIN P. SCHWADRON, *Primary Examiner.*

L. L. JOHNSON, *Assistant Examiner.*